(12) United States Patent
Mitchell

(10) Patent No.: US 12,478,281 B2
(45) Date of Patent: Nov. 25, 2025

(54) INSTANTANEOUS OLFACTORY DISEASE DETECTION SYSTEM AND METHOD OF USE OF DETECTION

(71) Applicant: Jeffrey Mitchell, Creve Coeur, MO (US)

(72) Inventor: Jeffrey Mitchell, Creve Coeur, MO (US)

(*) Notice: Subject to any disclaimer, the term of this patent is extended or adjusted under 35 U.S.C. 154(b) by 456 days.

(21) Appl. No.: 17/300,727

(22) Filed: Oct. 5, 2021

(65) Prior Publication Data

US 2022/0095948 A1 Mar. 31, 2022

Related U.S. Application Data

(63) Continuation-in-part of application No. 17/371,956, filed on Jul. 9, 2021, now abandoned.

(60) Provisional application No. 63/204,484, filed on Oct. 6, 2020, provisional application No. 63/050,521, filed on Jul. 10, 2020.

(51) Int. Cl.
| | |
|---|---|
| *A61B 5/08* | (2006.01) |
| *A61B 5/00* | (2006.01) |
| *A61B 5/097* | (2006.01) |
| *A61B 10/00* | (2006.01) |
| *A01K 15/02* | (2006.01) |

(52) U.S. Cl.
CPC ............. *A61B 5/082* (2013.01); *A61B 5/097* (2013.01); *A61B 5/4845* (2013.01); *A01K 15/02* (2013.01); *A61B 2010/0087* (2013.01)

(58) Field of Classification Search
CPC ........ A01K 15/02; A61B 5/082; A61B 5/097; A61B 5/4845; A61B 2010/0087
See application file for complete search history.

(56) References Cited

U.S. PATENT DOCUMENTS

| | | | |
|---|---|---|---|
| 5,029,342 A | 7/1991 | Stein et al. | |
| 5,123,114 A | 6/1992 | Desanti | |
| 5,337,739 A * | 8/1994 | Lehman ................. | B01D 46/10 |
| | | | 128/205.27 |
| 5,410,757 A | 5/1995 | Vienamo et al. | |
| 5,555,879 A | 9/1996 | Helin et al. | |
| 5,927,280 A | 7/1999 | Miyake | |
| 5,954,055 A | 9/1999 | Miyake | |
| 6,055,666 A | 5/2000 | Eklund et al. | |
| 6,060,689 A | 5/2000 | Wilson | |

(Continued)

*Primary Examiner* — Justin Xu
(74) *Attorney, Agent, or Firm* — David E. Crawford; FAST FORWARD LAW, LLC

(57) ABSTRACT

A bacterial and microorganism detector apparatus and system to provide quick and efficient sampling of a patient, or an attendee at an event, that allows for a canine or other animal to test the breath to determine the existence and presence of any deleterious particles, that may be present therein. The apparatus includes an intake device, in which the party breathes into an air drawing device such as a spirometer, or fan, a reservoir for collecting the sampled breath, a discard valve in the event that excessive breath has been taken in, an overflow valve from the reservoir, which then subjects the final segment of breath to filtration, which the animal can sniff for detection purposes, just before the remaining sample is discharged from the apparatus. The spirometer functions to withdraw air from the lungs of the treated party, for the sampling and testing purposes.

7 Claims, 4 Drawing Sheets

(56) References Cited

U.S. PATENT DOCUMENTS

| | | |
|---|---|---|
| D440,652 S | 4/2001 | Pollard |
| 6,345,620 B2 | 2/2002 | Salapow et al. |
| 6,723,056 B1* | 4/2004 | Alving ............... A61B 5/411 600/543 |
| 6,782,845 B1* | 8/2004 | Schmidt ............. A01K 1/0047 119/419 |
| 7,178,932 B1 | 2/2007 | Buckman |
| 7,534,005 B1 | 5/2009 | Buckman |
| 7,971,267 B2 | 7/2011 | Huh |
| 7,987,812 B2 | 8/2011 | Kim et al. |
| 7,992,558 B2 | 8/2011 | Thornton et al. |
| 8,051,855 B2 | 11/2011 | Ho et al. |
| 8,331,001 B2 | 12/2012 | Hsieh et al. |
| 8,381,312 B2 | 2/2013 | Seo |
| 8,387,163 B2 | 3/2013 | Beliveau |
| 8,528,561 B2 | 9/2013 | Ng et al. |
| 8,550,084 B2 | 10/2013 | Ng et al. |
| 8,776,263 B1 | 7/2014 | Fitos |
| 8,826,464 B2 | 9/2014 | Wu |
| 9,009,862 B2 | 4/2015 | Huh |
| 9,119,931 B2 | 9/2015 | D'Souza et al. |
| 9,250,222 B2 | 2/2016 | Furton et al. |
| 9,655,784 B2 | 5/2017 | North |
| 9,700,695 B2 | 7/2017 | Steiner, III |
| 9,950,131 B2 | 4/2018 | Ng et al. |
| 9,962,511 B2 | 5/2018 | Ng et al. |
| 9,975,134 B2 | 5/2018 | Ko et al. |
| 9,998,804 B2 | 6/2018 | Awiszus |
| 10,004,866 B2 | 6/2018 | Davis |
| 10,231,495 B2 | 3/2019 | Nabai |
| 10,231,812 B2 | 3/2019 | Liu et al. |
| 10,251,786 B2 | 4/2019 | Yang |
| 10,286,173 B2 | 5/2019 | Davis |
| 10,286,416 B2 | 5/2019 | Han et al. |
| 10,401,651 B2 | 9/2019 | Hofer-Kraner et al. |
| 10,542,332 B2 | 1/2020 | Awiszus et al. |
| 10,588,373 B2 | 3/2020 | Staudinger |
| 10,660,385 B2 | 5/2020 | Nagao et al. |
| 2009/0162196 A1* | 6/2009 | Drolet ............... A01K 15/02 415/224 |
| 2015/0032019 A1* | 1/2015 | Acker ............... A61B 5/097 600/532 |
| 2015/0335267 A1* | 11/2015 | Cormier ............ A61B 5/0836 600/532 |
| 2015/0362478 A1* | 12/2015 | Phillips ........... G01N 33/4972 73/23.3 |
| 2018/0092335 A1* | 4/2018 | Hall ............... A61B 10/0038 |
| 2019/0142303 A1* | 5/2019 | Wondka ............ A61B 5/097 600/532 |

* cited by examiner

INSTANTANEOUS OLFACTORY DISEASE DETECTION SYSTEM AND METHOD OF USE OF DETECTION

CROSS-REFERENCE TO RELATED APPLICATIONS

This non-provisional application is filed upon the provisional application having Ser. No. 63/204,484, filed on Oct. 6, 2020; and this application is a continuation-in-part of the patent application having Ser. No. 17/371,956, filed on Jul. 9, 2021, and which application is a non-provisional for the provisional application having Ser. No. 63/050,521, filed on Jul. 10, 2020.

FIELD OF THE INVENTION

The concept of this invention is to provide a means for detecting the presence of an unhealthy microorganism or virus, detected by an animal, such as a dog, after the party being tested has exhaled into a mouthpiece, although the final iteration of device will not likely have a mouthpiece but will be touchless and the breath sample will be collected in a funnel of sorts, the breath or any other biological sample such as urine, sweat, tissue etc. being sanitized and filtered by the apparatus, and conveyed through a spirometer. The spirometer is just used during the initial phases to figure out how much of a breath sample is needed and draws in the breath, the spirometer captures the last portion of the breath to be investigated, and that segment of the breath is conveyed to a chamber of a presentation device that can be sampled by the animal, such as the dog or canine, that has been trained to detect the presence of such microorganisms, or the lack of such, upon prompt testing of the subject party.

BACKGROUND OF THE INVENTION

The invention relates generally to disease detection, such as a detection system and more specifically to an olfactory disease detection system that isolates and can contain the entire breath or the last part of an exhalation so as to test the contents thereof for disease or other foreign substance content.

Common disease detection systems test for the presence of bacteria, virus, or their byproducts in the blood or other bodily fluids of a subject. To obtain these samples, the subject is lanced with a needle to draw blood, or a swab is inserted in the mouth, nose, ears, or other orifice where the fluid to be tested is found. After the sample is taken, it is sent to a laboratory where the culture or sample is processed to encourage the growth of organisms in the sample or passed through other procedures to isolate and quantify the contents of the sample to determine the presence of the disease that is tested for.

One of the problems associated with common disease detection systems is their limited efficiency. For example, one test for COVID-19 includes the collection of a deep nasal swab. In this procedure a cotton or absorbent material attached to a rod or stick is inserted through the nose to the back of the nasal cavity where it is painfully twisted and moved about to collect material therefrom. This procedure is very uncomfortable at best and is often painful, as experienced.

Additionally, the time between when the sample is taken, and the results are available could be days or weeks. In the interim the person must remain in isolation to prevent the spread of the potential disease.

While developments have been made in the area of disease detection systems there remains room for further improvement.

There currently is experimentation being done to detect the presence of various deleterious items, such as explosives, narcotics, bed bugs, and even in the healthcare industry, to sniff out various diseases, whether they be Parkinson's, various seizures induced from illness, and the like. There is even some testing being done on the deployment of Coronavirus-sniffing dogs, in an effort to try to provide a more prompt and quick method for detecting the presence of such a microorganism, at generally public places, such as at airports, schools, gatherings, various events, such as sporting events, and the like.

It does not appear that any patents have been obtained, as yet, upon any such processes, although earlier patents have touched upon the broad concept of providing methods of calibrating a biological detector, such as can be seen in the U.S. Pat. No. 9,250,222, upon a Universal Detector Calibrant. It appears that this may be more useful in the laboratory, rather than more expedited generalized applications, as the subject matter of this current invention.

There are a variety of prior patents relating to means for preventing exposure of individuals to suspect air, such as can be seen in the face shield of U.S. Pat. No. 6,055,666. Other types of aerating type of face shields can be seen in U.S. Pat. Nos. 5,029,342; 5,410,757; 4,933,993; 5,123,114; 9,655,784; as can be seen in the prior art.

Also, there are a variety of masks that provide an effort to prevent the inhaling of biological or microorganism laden air, in order to prevent any infection to the wearer, as can be seen in U.S. Pat. Nos. 10,660,385; 10,004,866; 9,962,511; 9,700,695; 8.387,163; 4,856,509; 4,323,063; 10,231,495; 9,975,134; 5,954,055; and related types of respiratory masks or personal protective equipment as is known currently in the art.

These are examples of what are known to exist in the prior art, to the Applicant's knowledge.

SUMMARY OF THE INVENTION

In this development, the concept is to propose a system, and associated apparatus, to further develop a bacteria or microorganism detection system, that may be used in a variety of fields for determining the presence of deleterious bacteria, or the like, but more specifically, to provide a means for detecting Covid-19, and any subsequent harmful microorganisms that may be derived, therefrom, in the future. Generally, it includes a system of mechanics, including an intake means, such as a tube, in which the patient will breathe, a reservoir for collecting that intake, an overflow valve that provides for the discarding of excess breath, the overflow valve also providing for a determination of the latter portion of the breath of the patient, emanating from the lungs, and which may be more ladened with the microorganism or virus, the subject of detection. That portion of the breath, after passing through a variety of filters, and even a final filter that presents only the final segment of breath, for transmission to an enclosed space, for which the canine or other mammal can sniff, to determine the presence of any select microorganism, and to provide a very quick test for determining whether the party under examination, tests positive for the presence of such microorganism, or not. The system further includes means for the discharge of and expunging of the sample, following testing, in a manner that does not transmit such sample to others, that could lead towards further infection.

The general concept of this invention can be used to detect the virus, salmonella, cancer, etc.

Thus, this development more specifically is a Covid-19 detector device, provides for instantaneous detection of the presence of such microorganisms within the patient's breath, using the sensory perception of a trained mammal, such as a canine. The canine sensory technology is being used by various organizations, including law enforcement, private detective agencies, and the armed forces in order to sniff out explosives, narcotics, and bed bugs, just to name a few. In the healthcare industry, canines are used to sniff out C.DIFF, as previously reviewed, including Parkinson's, seizures, and other medical conditions. The development of this current system is that it can significantly increase the sensitivity of the canine sensing and can be used to detect Covid-19 biomarkers in the potentially infected patients. Sensing disease biomarkers by canines has been investigated over the last couple of decades but has been found to have low resolution and sensitivity, leading to high rates of false positives and negatives. Essentially, the current device consists of a HEPA filter in between a tube. One end of the tube is connected to the patient of interest, such as in the mouth, and the other end is exposed to the canine, after processing of the collected breath. The breath passes through the HEPA filter that captures possible particulate matters, such as pollens, bacteria, and other microorganisms. It is to be noted that the HEPA filter can filter even sub 100 nm particles, and therefore, should be capable of filtering the Covid-19 virus, in its usage. Foreign airborne particles can cause allergies and penetrate deep pulmonary space, which can affect sensing abilities of the canine. It is believed that the removal of pollens and other microorganisms improves the detection ability of the canine, during usage.

A further concept of this invention is to make a version of this technology in the future that is a helmet like structure that the canine would wear that would have the HEPA filters in it so the dog could quickly run along a line of samples and screen many more samples at once.

It is, therefore, the principal object of this invention to provide a system including a device that functions as a spirometer to draw breath from the body of the patient, filters the same, allow a disease detecting animal to then determine the existence of select microorganisms, or even bacteria, to furnish prompt testing of the subject, and others, generally at heavily populated centers, such as a hospital, airport, athletic centers, as known in the art.

A further object of this invention is to provide a device and system that can quickly test participants or persons at crowded facilities, whether it be at the airport, sporting events, other entertainment centers, to promptly screening for the presence of any harmful bacteria or organisms to assure the health of the attendees.

Another object of this invention is to provide a means for the training of particular canines, to detect the presence of any microorganisms, that are drawn from the person, either during mass testing, or individual observation, to determine the presence of any harmful disease, to assure proper screening for the safety of all in attendance.

Another object of this invention is to test the final part of a patient's breath, after filtering, to determine the presence of any virus.

These and other objects may become more apparent to those skilled in the art upon review of the Summary of the Invention as provided herein, and upon undertaking a study of the Description of its Preferred Embodiments, in view of the drawings.

DESCRIPTION OF THE PREFERRED EMBODIMENT

The present invention is described herein to provide insight and knowledge of the idea and the benefits it provides. Aspects of the idea will provide additional benefits to those skilled in the art and should be respected as the intellectual property of the inventor. While changes and modifications to the described idea are natural in the development process, it is anticipated that these changes will not alter or diminish the scope of this invention.

This invention overcomes the limited efficiencies of common detection systems and allows for rapid determination of the presence of airborne indicators for disease, controlled substances, explosives, or the like. The invention captures and makes available for inspection volatile organic compounds (VOCs) in a safe environment and are used to determine the presence of a target material.

Figure 1:
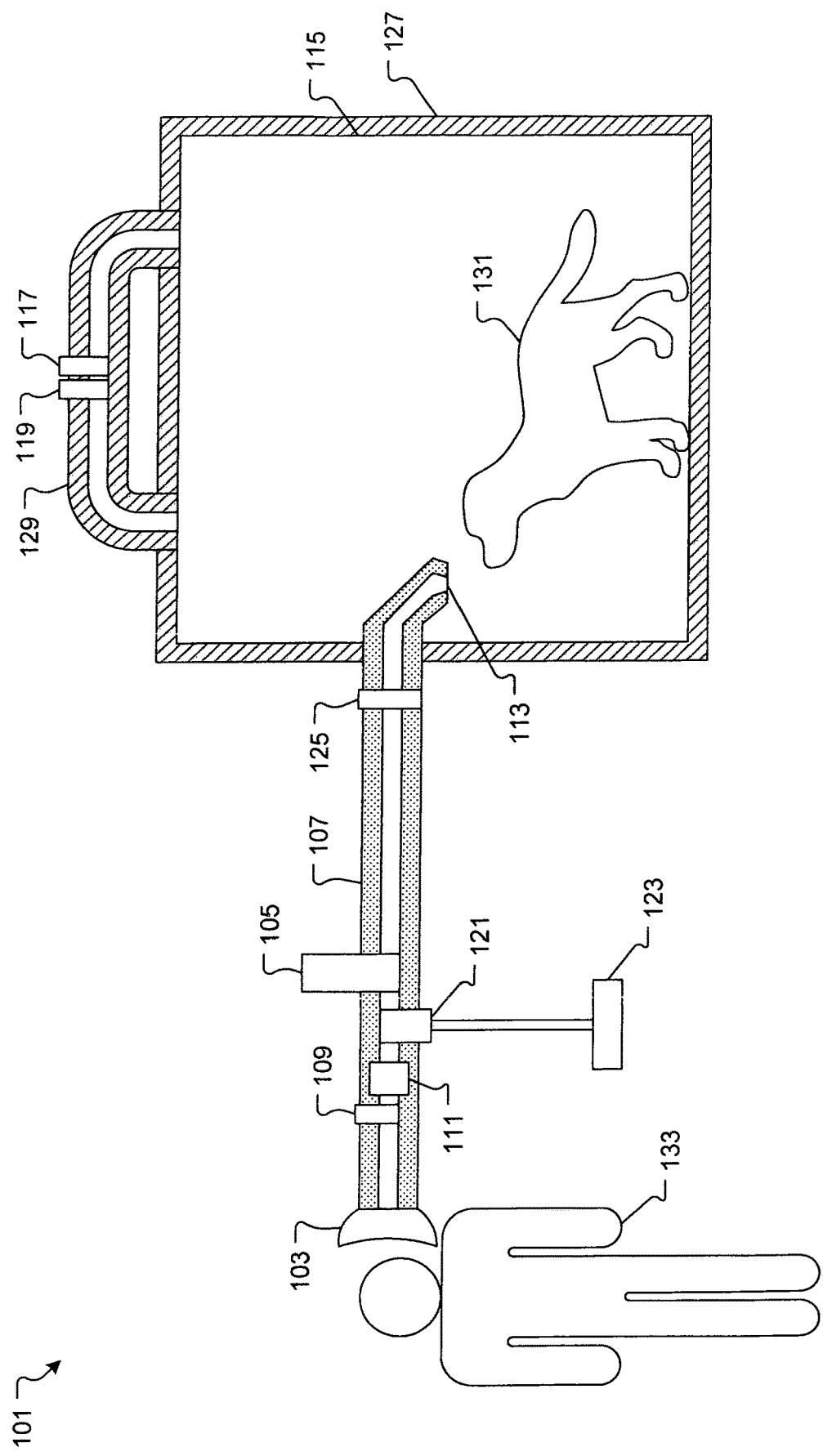
FIG. 1 is a diagram of an olfactory disease detection system in practice in accordance with the preferred embodiment of the invention.

Referring now to the figures, the invention of the application will be described in its detail components. It will be understood that like numbers in the various figures are indicative of the same part or piece in multiple figures. FIG. 1 depicts a diagram of an olfactory disease detection system in its preferred embodiment. It will be understood that system 101 overcomes the inefficiencies related to common disease detection systems.

The preferred embodiment of system 101 includes a mouthpiece or sample intake 103 that is in fluid communication with a spirometer or isolator 105. The mouthpiece 103 is inserted into the mouth of the patient being tested. The flow path 107 therebetween includes a first HEPA filter 109 and a valve 111. The spirometer 105 is further in fluid communication with a presentation device 113 that is within an enclosed space 115 of an enclosure 127. The air within the enclosed space 115 enters through the top under positive pressure from the flow path 129, and cycles through a second HEPA 117 and a charcoal filter 119. In this manner less contamination is encountered. Volatile organic compounds (VOCs) from a user's breath are pulled through the first HEPA filter 109, spirometer 105 and to the presentation device 113 by a drafting fan 125.

A purge valve 121 is attached between the mouthpiece 103 and the spirometer 105 and is in fluid communication with a clean air source 123. In the preferred embodiment the clean air source 123 provides medical air that is dry, free from odors, and contamination. It is contemplated that other air sources could be used and that the air from these sources could be cleaned or otherwise prepared for use in the system 101. The purge valve 121 is configured to introduce air into the system 101 to remove any VOCs after a cycle is processed. Ultraviolet lights are positioned throughout the system to irradiate any organisms, virus, bacteria, or the like therein.

Figure 2:
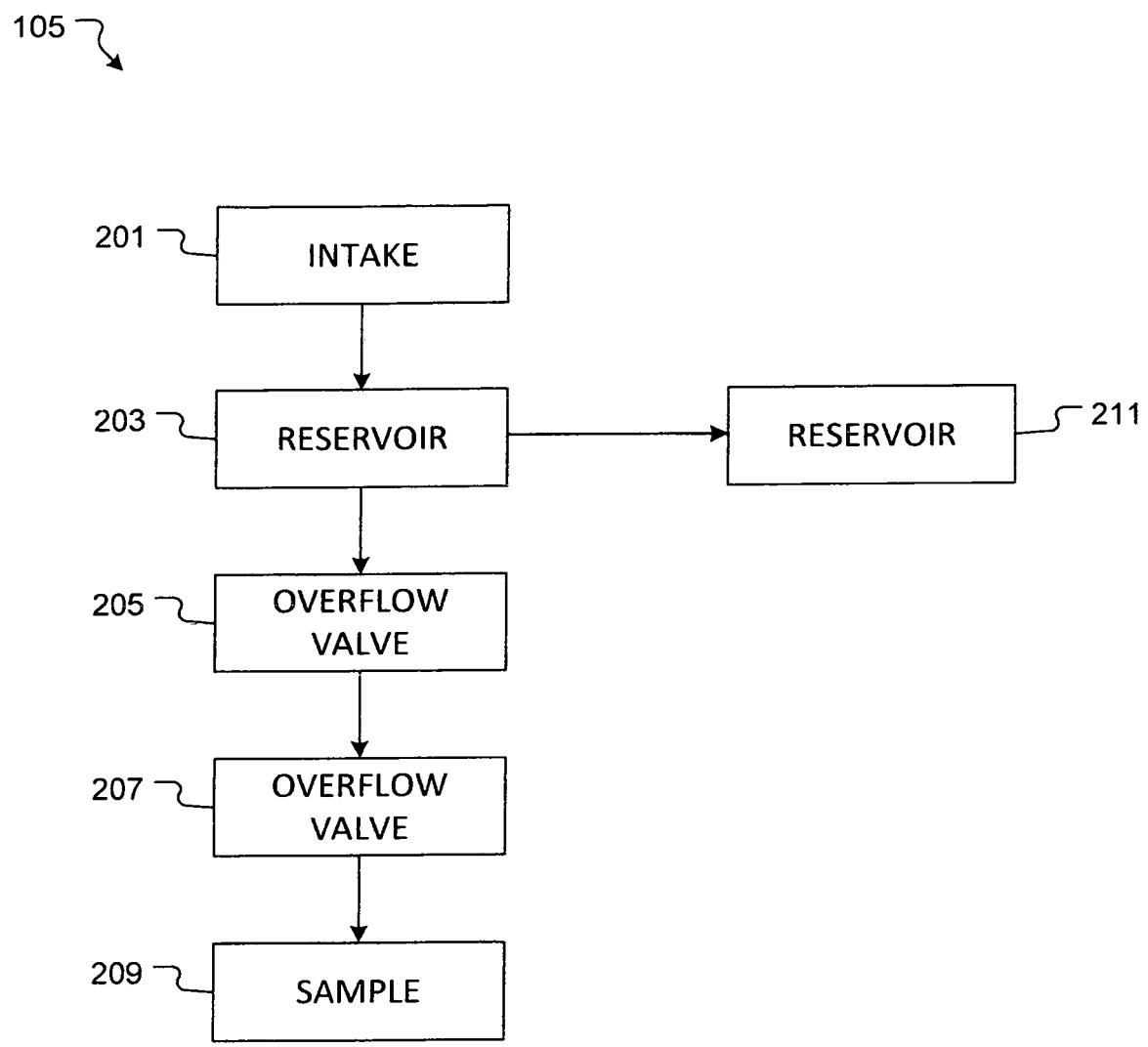
FIG. 2 is simplified schematic of the spirometer of FIG. 1.

Referring now to FIG. 2 the spirometer 105 is further depicted and is configured to select a portion of the user's breath. Spirometer 105 includes an intake port 201 in fluid communication with at least one reservoir 203. It is contemplated that the reservoir 203 is sized to hold a large portion of a breath. The reservoir 203 is also in fluid communication with an overflow valve 205 that opens an exit 207 once the reservoir 203 is full. The portion of the breath that passes through the overflow valve 205 becomes the sample 209 to be tested. The early portion of the breath that is captured by the reservoir is then discarded at 211, vented, or otherwise disposed of. It is contemplated that this could be accomplished by mechanical methods, the inflation of a bladder, or the like.

In use, a person will approach the system 101 and place the mouthpiece 103 in their mouth. The person will then exhale through the mouthpiece 103 the breath passes through the first HEPA filter 109 that removes viruses, bacteria, and other contaminants from the breath but allows VOCs to pass through. The VOC breath then passes through the valve 111 to spirometer 105 where a portion of the VOC breath travels to the presentation device 113. The VOC breath portion is then examined by a canine 131 that is trained to detect VOCs indicative of disease and in the preferred embodiment the canine is capable of detecting COVID-19.

It is contemplated that any animal capable of indicating the presence of VOCs of a particular disease could be used, for example, bees.

It is believed that one of the unique characteristics of the invention is that the breath of the person is used to detect the presence of a disease therein. This provides a comfortable and easily repeatable test that is not intrusive and limits the exposure of people that administer the test for the presence of the disease.

Additionally, once the person has provided their breath the results are available within a few minutes so that efforts to control the spread of the disease can be put in place with a positive result and that no time is wasted if the result is negative.

Figure 3:
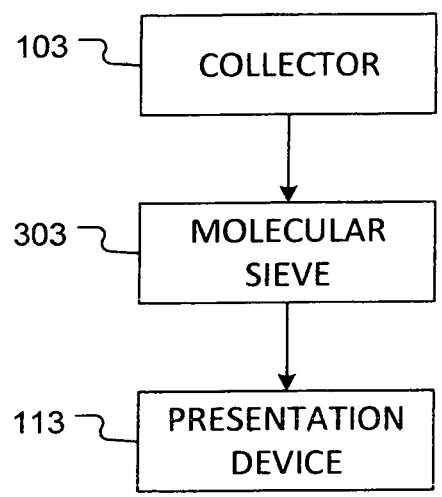
FIG. 3 is a simple schematic of an alternative embodiment of the system of FIG. 1.

Referring now to FIG. 3, an alternative embodiment of the system 101 is depicted. The embodiment 301 includes similar features as system 101 wherein a molecular sieve 303 is in the fluid path of the breath from the user to the animal. The molecular sieve 303 is configured to capture a single VOC or a class of similar VOCs. It is contemplated that the selected VOCs are then directed to the animal for detection. The selected VOCs could remain in the fluid flow or could be captured by the molecular sieve 303 so that the molecular sieve 303 is presented to the animal for detection.

Figure 4:
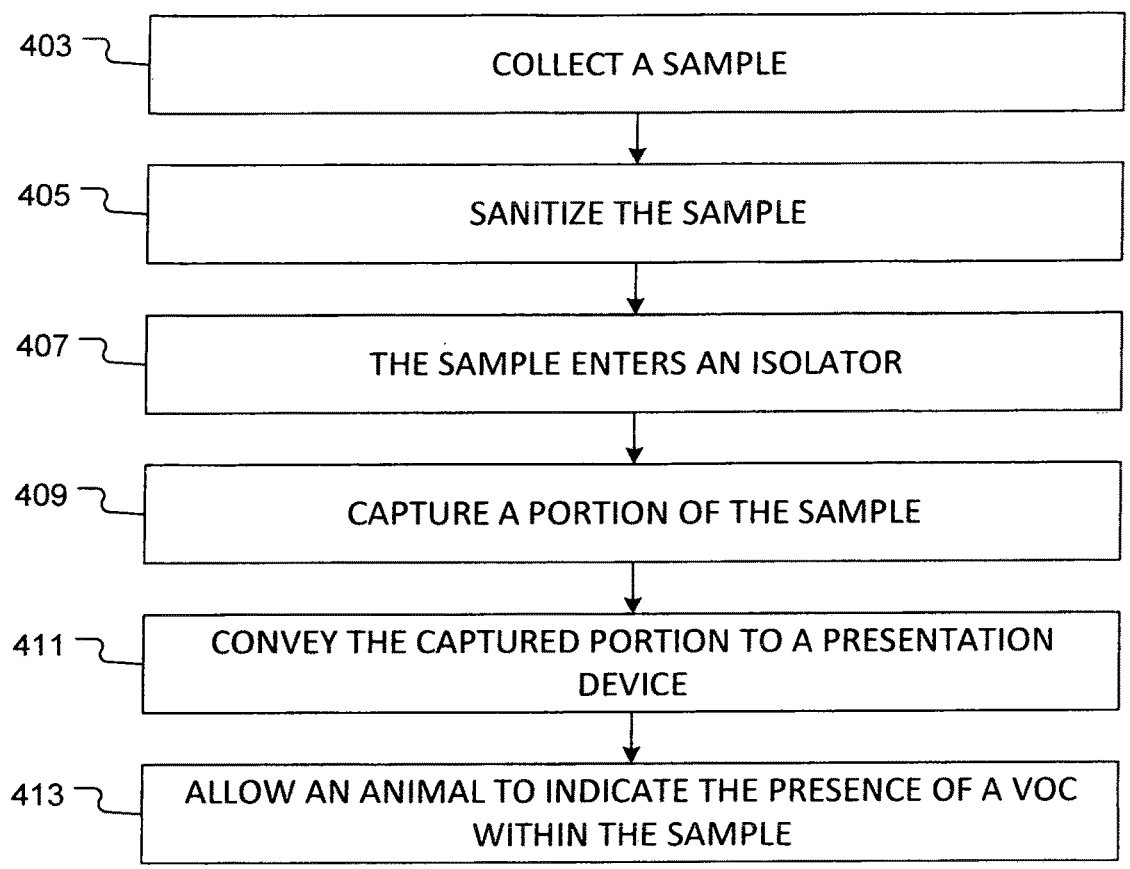
FIG. 4 is a flowchart of a method of detecting a disease.

Referring now to FIG. 4, a method of detecting a disease is depicted. Method 401 includes a person exhaling in a mouthpiece 403, sanitizing by filtration the breath 405, the breath entering a spirometer 407, allowing the spirometer to capture the last portion of the breath 409, conveying the captured portion of the breath to a presentation device 411, and allowing an animal to indicate the presence of a VOC as at 413. Preferably, the last portion of breath will be the last fifty percent of breath, more or less, for testing.

The concepts and principles described above are not meant to limit the scope of the invention or its manner of implementation. The concepts and principles of the idea are intended to be protected in part and in whole.

The Summary of the Invention as provided herein, and its Preferred Description of the Embodiments, and as depicted in the drawings, are set forth for illustrative purposes only.

I claim:

1. An olfactory disease detection system for testing whether a subject has a particular disease, said system comprising:
    an enclosure defining a space sized for receiving an animal capable of recognizing volatile organic compounds (VOCs) of the particular disease and indicating presence of said particular diseases;
    a presentation device having an outlet positioned in the space for delivering a fluid sample to the space and presenting the fluid sample to the animal when received in the space;
    a mouthpiece adapted for receiving breath from a subject;
    an intake conduit defining an intake flow path extending between the mouthpiece and the presentation device;
    an intake high efficiency particulate (HEPA) filter positioned along said intake flow path between the mouthpiece and the presentation device sized to reduce contaminants and content from the breath without eliminating the particular disease VOCs thereby providing a decontaminated breath sample;
    a spirometer positioned along the intake flow path between the intake HEPA filter and the presentation device for isolating a trailing portion of the breath sample thereby preparing the fluid sample for presenting to the animal;
    a fan positioned along the intake flow path for drawing the breath through the HEPA filter and for drawing the fluid sample through the spirometer and delivering the fluid sample to the space through the presentation device; and
    a valve in fluid communication with a clean air source positioned along the intake flow path for selectively introducing clean air to the intake flow path and space to purge said particular disease VOCs from the intake flow path and space to prepare the olfactory disease detection system for testing a later subject.

2. An olfactory disease detection system as set forth in claim 1, further comprising:
    a recirculation conduct having a recirculation flow path in fluid communication with the space for recirculating the fluid sample from the space through the recirculation flow path and to the space; and
    a recirculation HEPA filter positioned along the recirculation flow path for filtering the fluid sample recirculating through the recirculation flow path.

3. An olfactory disease detection system as set forth in claim 1, further comprising a molecular sieve positioned along said intake flow path between the mouthpiece and the presentation device adapted to isolate the particular disease VOCs.

4. An olfactory disease detection system, comprising:
    an enclosure defining a space sized for receiving an animal capable of recognizing volatile organic compounds (VOCs) of the particular disease and indicating presence of said particular disease VOCs;
    a presentation device having an outlet positioned in the space for delivering a fluid sample to the space and presenting the fluid sample to the animal when received in the space;
    a valve in fluid communication with a clean air source and the presentation device for selectively introducing clean air to the presentation device and space to purge said particular disease VOCs from the presentation device and space to prepare the olfactory disease detection system for testing a later subject;
    a high efficiency particulate air (HEPA) filter in fluid communication with the presentation device sized to reduce contaminants and content from collected fluid without eliminating the particular disease VOCs thereby providing a decontaminated fluid sample; and a fluid drawing device configured to isolate a trailing portion of the decontaminated fluid sample thereby preparing a fluid presentation sample for presenting to the animal.

5. An olfactory disease detection system as set forth in claim 4, wherein the collected fluid consists of breath collected from a human subject.

6. An olfactory disease detection system as set forth in claim 4, wherein the collected fluid consists of air flowing over a sample to test whether contaminants are present on the sample.

7. An olfactory disease detection system, comprising:
- a fluid intake for introducing a fluid specimen to the system;
- a high efficiency particulate air (HEPA) filter in fluid communication with the fluid inlet sized to reduce contaminants and content from the fluid specimen without eliminating volatile organic compounds (VOCs) of a particular disease thereby providing a decontaminated fluid specimen;
- a spirometer downstream from the HEPA filter adapted to isolate a trailing portion of the decontaminated fluid specimen thereby preparing a fluid sample;
- a presentation device having an outlet positioned in a space sized for receiving an animal capable of recognizing the particular disease VOCs and indicating presence of said particular disease VOCs, said presentation device being capable of delivering the fluid sample to the space and presenting the fluid sample to the animal when received in the space; and
- a valve in fluid communication with a clean air source and said space for selectively introducing clean air to the space to purge said particular disease VOCs from the space to prepare the olfactory disease detection system for testing a later subject.

* * * * *